C. C. TROWBRIDGE.
APPARATUS FOR PRESERVING ICE CREAM AND OTHER MATTER.
APPLICATION FILED JULY 12, 1905.
907,099.
Patented Dec. 15, 1908.
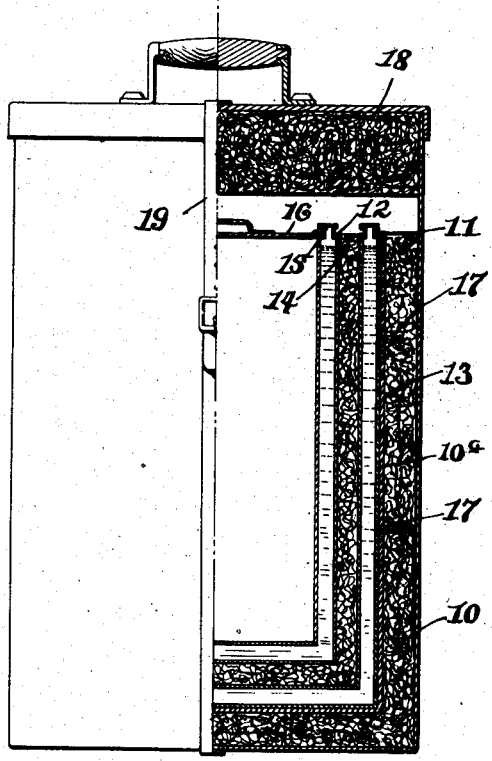
WITNESSES:
JCBauta.
Frank L. Stubbs.
INVENTOR.
Charles C. Trowbridge.
BY W. B. Hutchinson
ATTORNEY.

UNITED STATES PATENT OFFICE.

CHARLES C. TROWBRIDGE, OF NEW YORK, N. Y., ASSIGNOR OF TWO-THIRDS TO HERSCHEL C. PARKER, OF NEW YORK, N. Y.

APPARATUS FOR PRESERVING ICE-CREAM AND OTHER MATTER.

No. 907,099.   Specification of Letters Patent.   Patented Dec. 15, 1908.

Application filed July 12, 1905. Serial No. 269,395.

*To all whom it may concern:*

Be it known that I, CHARLES C. TROWBRIDGE, of the city, county, and State of New York, have invented a new and Improved Apparatus for Preserving Ice-Cream and other Matter, of which the following is a full, clear, and exact description.

My invention relates to improvements in apparatus for keeping ice cream, water ices and other things in a frozen or cool condition, and the object of my invention is to produce a simple apparatus which will avoid the necessity of using crushed ice and brine, and which will keep the contained matter in proper condition for a longer time than an ordinary apparatus.

My invention comprises a multi-cellular structure in which the cells are concentrically arranged, and contain matter which is frozen and which has a melting point below that of the ice cream or other substance contained in the apparatus. The plural cells above referred to contain refrigerant substances having different melting points, so that the frozen substance in the outer cell, for instance, will have to be melted by absorption of heat passing through the walls of the device before the matter of the second cell can be attacked, and so on through any necessary number of cells. It will be seen that this arrangement combined with the fact that non-conductors are arranged between the cells and outside the outer cell causes the contained matter to be preserved for a long time, as the cells are successively attacked and further, the matter is well preserved because the nature of the frozen material is such that there are no convection currents passing through the structure, and so a uniform condition of the contained substance is maintained for a long time.

The invention also includes a special arrangement of the plural refrigerant holding cells and the nonconducting substance permanently interposed between them, permitting all the cells and said non-conducting substance to be removed together from the main outer casing to allow placing of the complete multi-cellular structure in cold storage to initially chill it prior to replacing it within the casing for preserving material placed within the inner wall of the inner cell.

With these ends in view my invention consists of an apparatus for preserving, in a cool condition, ice cream and other substances, which apparatus will be hereinafter described in detail and the novel features claimed.

Reference is to be had to the accompanying drawings forming a part of this specification, in which the figure is a view partly in elevation and partly in vertical section, of an apparatus embodying my invention.

The form of the apparatus is not very essential but as ice cream and similar things usually come in square packages, it is advisable to make the structure rectangular in cross section, but this form can, of course, be departed from at will. I have an outer shell 10 which can be conveniently made of galvanized iron, but can also be made of other suitable substance, and an inner lining $10^a$, the space between being filled with a non-conductor, as described below. Spaced apart and concentrically arranged within the shell are the cells 11 and 12, two being shown, though a greater number can be used if necessity requires it. A heavy lining 13 of non-conducting material such as felt, wool, fiber, cat-tails (preferably the latter), is placed between the lining $10^a$ and the shell 10 and also as at 14, between the two cells 11 and 12. If more cells are used the non-conducting material is, of course, interposed between the several cells. The inner cell forms the inner lining or wall of the receptacle or chamber containing the ice cream or other matter and this is provided with a suitable cover 16, and the cells can be provided with stopples 15 to permit them to be readily filled or emptied. To prevent displacement of the material 13, the lining $10^a$ can be provided with flanges 17 as shown, and similar flanges can, if desired, be put on the outer wall of the inner cell or the inner wall of the outer cell. The apparatus is provided with a suitable cover 18 having a heavy non-conducting lining and if desired, the cover can be provided with cells or zones of frozen substance having the low melting point referred to. The cover 18 can be fastened on in any convenient way, as for instance, by means of a strap 19.

In practice the ice cream, it will be understood, is placed in the receptacle formed by the inner cell 12, the covers 16, 18, put on and the cream delivered as usual. It will be noticed that the apparatus is easily portable and can be handled to great advantage. It is better to fill the outer cell 11 with material having a low melting point and the cell 12 with material having a slightly higher melting point than that of the cell 11, but still lower than the matter contained in the receptacle, although if the material in the several cells has the same melting point, the invention will still possess advantages because it will be seen that as the heat passes through the non-conductor 13, it will be absorbed by the material in the cell 11, leaving, up to this point, the inner cell unaffected, and then, when the heat passes still further through the non-conductor 14 to the cell 12, it will still be unable to attack the matter contained in the receptacle until all the ice or other refrigerant in the cell 12 is melted. Thus it will be seen that I provide a simple scheme for preserving cold, for a long time, ice cream or similar frozen things.

It will be understood, of course, that before the apparatus is used it is placed in cold storage so as to be thoroughly chilled, and so as to freeze the material in the cells 11 and 12. It will also be understood that it is desirable to make these cells of copper or some material which does not easily corrode or oxidize. It will also be noticed that the two cells 11 and 12 with the non-conductor 14 between them, can be lifted from the main apparatus and made cold by placing them in a cold storage plant so that it is not really necessary to chill the whole affair.

Having thus fully described my invention, I claim as new and desire to secure by Letters Patent,—

An apparatus of the kind described comprising a shell, a lining therefor and separated therefrom, a non-conductor of heat within the space between the shell and lining, a plurality of removable spaced cells within the shell for holding refrigerants melting at different temperatures, the inner cell forming the wall of a chamber for the matter to be preserved, non-conductors of heat in the spaces between the cells, and a cover engaging the shell.

CHARLES C. TROWBRIDGE.

Witnesses:
WARREN B. HUTCHINSON,
HERSCHEL C. PARKER.